US012607120B2

(12) United States Patent
Abdallah et al.

(10) Patent No.: US 12,607,120 B2
(45) Date of Patent: Apr. 21, 2026

(54) INTER-WELL PETROPHYSICAL ASSESSMENT BY NANO-PARTICLE INJECTION IN THE FORMATION

(71) Applicant: Schlumberger Technology Corporation, Sugar Land, TX (US)

(72) Inventors: Wael Abdallah, Al-Khobar (SA); Nestor Herman Cuevas, Tananger (NO); Andrew J. Speck, Milton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 78 days.

(21) Appl. No.: 18/596,714

(22) Filed: Mar. 6, 2024

(65) Prior Publication Data

US 2024/0301791 A1    Sep. 12, 2024

Related U.S. Application Data

(60) Provisional application No. 63/488,682, filed on Mar. 6, 2023, provisional application No. 63/488,575, filed (Continued)

(51) Int. Cl.
| | |
|---|---|
| *E21B 49/08* | (2006.01) |
| *G01V 3/26* | (2006.01) |
| *G01V 3/30* | (2006.01) |

(52) U.S. Cl.
CPC .............. *E21B 49/087* (2013.01); *G01V 3/26* (2013.01); *G01V 3/30* (2013.01)

(58) Field of Classification Search
CPC ........ E21B 49/087; E21B 43/26; E21B 43/16; G01V 3/26; G01V 3/30
See application file for complete search history.

(56) References Cited

U.S. PATENT DOCUMENTS

| | | | | |
|---|---|---|---|---|
| 2003/0042018 A1* | 3/2003 | Huh | .................... | E21B 43/2408 |
| | | | | 166/249 |
| 2016/0040514 A1* | 2/2016 | Rahmani | .................. | G01V 3/30 |
| | | | | 703/2 |

(Continued)

OTHER PUBLICATIONS

Miller, Quin R. S., Schaef, H. Todd, Nune, Satish K., Jung, Ki Won, Burghardt, Jeffrey A., Martin, Paul F., Prowant, Matthew S., Denslow, Kayte M., Strickland, Chris E., Prasad, Manika, Pohl, Mathias, Jaysaval, Piyoosh, and B. Peter McGrail. "Geophysical Monitoring with Seismic Metamaterial Contrast Agents." Paper presented at the SPE/AAPG/SEG Unconventional Resources Technology Conference, Denver, Colorado, USA, Jul. 2019. doi: https://doi.org/10.15530/urtec-2019-1123, 7 pages.

*Primary Examiner* — Silvana C Runyan
(74) *Attorney, Agent, or Firm* — Jeffrey D. Frantz

(57) ABSTRACT

Systems and methods are provided for locating hydrocarbons near a wellbore, determining petrochemical properties of a reservoir, and assessing hydrocarbon saturation between reservoirs. The nanoparticles can be positively charged and have properties that make them explode upon contacting crude oil. Sensors can be strategically placed near the wellbore to measure micro tremors caused by nanoparticle explosions. When the fluid is pumped into the wellbore, the fluid is forced into the surrounding rock formations. The fluid can contact crude oil in the rock formations, and the nanoparticles can attract to the fluid/oil interface due to negatively charged particles in the crude oil. When the nanoparticles reach the fluid/oil interface, they can contact the crude oil and explode. The seismic sensors can detect micro tremors caused by the nanoparticle explosions. The seismic sensor readings can be superimposed to identify the location of the crude oil and assess hydrocarbon saturation.

20 Claims, 4 Drawing Sheets

Related U.S. Application Data on Mar. 6, 2023, provisional application No. 63/488,582, filed on Mar. 6, 2023.

(56) References Cited

U.S. PATENT DOCUMENTS

| | | | |
|---|---|---|---|
| 2021/0041591 A1* | 2/2021 | Riachentsev | ........... E21B 49/08 |
| 2024/0036274 A1* | 2/2024 | Jaaskelainen | ........... E21B 47/09 |

* cited by examiner

210 — PLACE SEISMIC SENSORS SURROUNDING A WELLBORE

220 — PUMP DRILL FLUID INTO A WELLBORE, THE DRILL FLUID INCLUDING POSITIVELY CHARGED NANOPARTICLES

230 — RECORD SEISMIC DATA RELATING TO SEISMIC EVENTS CAUSED BY THE NANOPARTICLES EXPLODING IN RESPONSE TO CONTACT WITH CRUDE OIL

240 — DETERMINE A LOCATION OF HYDROCARBONS BASED ON THE SEISMIC DATA

PLACE SENSORS AROUND A WELLBORE    410

PUMP DRILL FLUID INTO A WELLBORE, THE DRILL FLUID INCLUDING NANOPARTICLES    420

DETECT SIGNALS EMITTED BY THE NANOPARTICLES    430

DETERMINE VOLUMETRIC SATURATION OF ROCK FORMATION BASED ON THE NANOPARTICLE SIGNALS AND PROPERTIES OF THE ROCK FORMATION    440

INTER-WELL PETROPHYSICAL ASSESSMENT BY NANO-PARTICLE INJECTION IN THE FORMATION

CROSS REFERENCE TO RELATED APPLICATIONS

This application claims the benefit of U.S. Provisional Patent Application No. 63/488,575, filed on Mar. 6, 2023; U.S. Provisional Patent Application No. 63/488,582, filed on Mar. 6, 2023; and U.S. Provisional Patent Application No. 63/488,682, filed on Mar. 6, 2023, all of which are hereby incorporated by reference in their entirety.

BACKGROUND

An oil and gas reservoir is a subsurface accumulation of hydrocarbons contained in porous or fractured rock formations. Reservoirs are assessed for hydrocarbon volume and production management. This can include assessing petrophysical properties of the reservoir, such as lithology, porosity, water saturation, hydrocarbon zones, permeability and density. The petrophysical properties indicate the rock properties of the reservoir, particularly how pores in the subsurface are interconnected, controlling the accumulation and migration of hydrocarbons. Petrophysical properties of a reservoir generally include acquiring well log measurements (where a string of measurement tools is inserted in the borehole), core measurements (where rock samples are retrieved from subsurface), seismic measurements, and surface logging statements.

However, current logging methods are only capable of accurately assessing reservoir properties near a wellbore, but they cannot assess the reservoir properties deeper in the formation. The current logging methods therefore can only create a limited assessment of the reservoir's properties. Furthermore, the current logging methods cannot assess reservoir properties during production phases. Because of this, current logging methods are unable to determine when reservoir petrophysical changes occur.

As a result, a need exists for deeper reservoir property assessment that can occur during production phases.

SUMMARY

Systems and methods are described herein for assessing reservoir petrochemical properties. Nanoparticles can be introduced into a fluid, such as a water or a water-based solution. The fluid containing the nanoparticles can be pumped into a wellbore. In one example, the fluid can be drilling fluid that is pumped into the wellbore at high pressure during the production phase of a drilling operation. For example, the fluid can be pumped into a well as part of a waterflooding scenario at any point after a wellbore is drilled. In another example, the fluid can be a separate fluid that is introduced to the well after drilling operations are complete. For example, after completing drilling operations, a fluid containing nanoparticles can be pumped into a well to assess or reassess the reservoir for hydrocarbon zones and saturation. The terms "fluid" and "drilling fluid" are used interchangeably throughout and refer to any fluid containing nanoparticles.

The properties of the nanoparticles can enable them to remain dispersed in the drilling fluid. Regardless of the lithology of the surrounding formation, the properties of the nanoparticles make it so that they exhibit no tendency to interact with particles in crude oil or to be absorbed into the formations. The nanoparticles can have low interfacial tension properties so as to avoid coagulation. The nanoparticles can have properties that cause them to emit a signal at a certain wavelength when excited by an external source. The nanoparticles can be attracted to the oil/water interface. The nanoparticles can absorb at the interface and release a secondary component that diffuses into the hydrocarbon phase. For optimal results, the secondary component can have a high diffusivity coefficient and create a contrast of electric, magnetic, or dielectric properties in the host medium. This improves the electromagnetic signal/response, thereby increasing the likelihood of being detected at the injector, observation, and production wells.

Additional mechanisms can be used to further enhance the properties contrast. For example, the secondary components can have surface coatings that cause the secondary components to prefer to agglomerate, which produces a more concentrated electromagnetic response. Additionally, the secondary components can be made to form a periodic array, which can enhance scattering at a specific wavelength, such as through formation of a Bragg grating.

Sensors that can read the signal emitted by the nanoparticles can be deployed at various locations prior to the production phase. For example, sensors can be placed at the surface, nearby observation wells, and nearby injection wells. During the production phase, the drilling fluid containing nanoparticles is pumped into the wellbore. In one example, the drilling fluid can be pumped into casing with perforated holes that is inserted in the wellbore. As the fluid is forced into the surrounding formation, the fluid can penetrate any gaps, holes, crevices, and porous material.

The sensors can detect and log the positions of the nanoparticles. In one example, the nanoparticle positions can be detected by exciting the drilling fluid and logging a contrast in electrical properties of the drilling fluid based on the presence of the nanoparticles. The drilling fluid can be excited using any appropriate technique, such as by introducing an electrical, magnetic, or electromagnetic field. As an example, an electromagnetic field can be created in or near the wellbore. The electromagnetic field can have enough strength to reach a desired distance from the wellbore. The electromagnetic field can excite the drilling fluid, causing the nanoparticles to emit their own electromagnetic signal or to alter the surrounding electromagnetic field. Alternatively, the excited nanoparticles can cause measurable changes in the surrounding electromagnetic field. The sensors can detect and log these electromagnetic signals, which can indicate the position of the nanoparticles.

In one example, a vector field can be applied to the reservoir area. A vector field can cause improved and quicker dispersing of the nanoparticles in the fluid. Various types of vector fields can be used to create this effect, such as generating an electromagnetic field, creating a temperature gradient between wells, creating a pressure gradient between wells, and so on.

The data logged by the sensors can be used to determine petrochemical properties of the reservoir. For example, the data can be used to determine the permeability, heterogeneity, and channel tortuosity of the reservoir. The data can also be used to identify connectivity inter-wells zonation. In one example, the sensors can log the nanoparticle positions over a period of time. The positional data can be aggregated to include all the positions in which nanoparticles were detected, thereby creating a more complete visualization of the reservoir. The data from multiple sensors can be superimposed to accurately determine the source location of an electromagnetic response, thereby indicating the location of hydrocarbons in the rock formation.

It is to be understood that both the foregoing general description and the following detailed description are exemplary and explanatory only and are not restrictive of the embodiments and examples, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EXAMPLES

Reference will now be made in detail to the present exemplary examples, including examples illustrated in the accompanying drawings. Wherever possible, the same reference numbers will be used throughout the drawings to refer to the same or like parts. The described examples are non-limiting.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Systems and methods are described herein for determining petrochemical properties of a reservoir. In an example, drilling fluid injected with nanoparticles can be pumped into a wellbore. The properties of the nanoparticles make it so that they exhibit no tendency to interact with particles in crude oil or to be absorbed into surrounding rock formations. When the drilling fluid is pumped into the wellbore, the fluid is forced into the surrounding rock formations. The drilling fluid can be excited, such as by creating an electromagnetic field. Properties of nanoparticles can cause them to respond to the excited drilling fluid by emitting an electromagnetic signal at a certain wavelength or to change the surrounding electromagnetic field. Sensors that are strategically placed can measure the signals and/or changes caused by the nanoparticles. The measurements can be used to determine nanoparticle locations and analyzed to determine the petrochemical properties of a reservoir.

Figure 1:
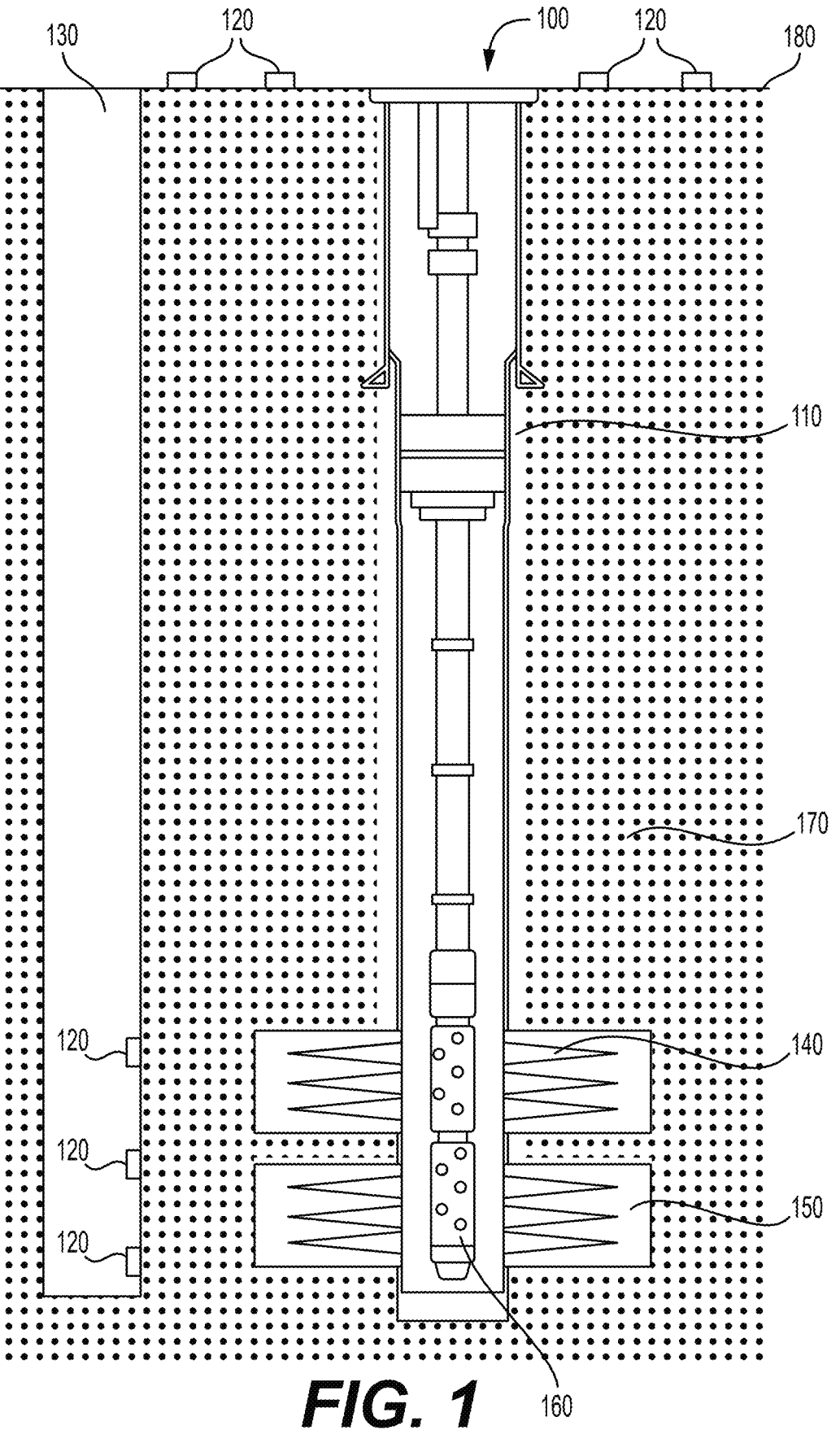
FIG. 1 is an example cross-sectional side-view illustration of a drilling assembly for determining reservoir petrochemical properties.

FIG. 1 is an example cross-sectional illustration of a drilling assembly 100 for determining reservoir petrochemical properties. The drilling assembly 100 is positioned in a cased wellbore 110. In another embodiment, the present invention can be implemented in an openhole (non-cased) wellbore. Prior to the production phase, a perforating gun 160 is lowered into the wellbore 110, and charges within the perforating gun 160 are ignited, thereby causing fractures 150 in the surrounding rock formation 170. The fractures 150 allow drilling fluid 140 to penetrate deeper into the rock formation 170.

Sensors 120 are strategically positioned in and around the wellbore 110. The sensors 120 can be any type of instrument that can measure certain events or conditions near the wellbore 110. Different types of sensors 120 can be placed near the wellbore 110 so that different types of measurements can be taken. As some examples, the types of sensors 120 used can include seismic sensors, electromagnetic sensors, temperature sensors, pressure sensors, and so on. The sensors 120 can be placed at various locations near the wellbore 110 so that reported readings from the sensors 120 can be combined to pinpoint the source location of certain events or particles, such as the positions of nanoparticles in drilling fluid. As an example, sensors 120 can be placed at surface 180, inside a neighboring wellbore 130, and inside the wellbore 110.

Nanoparticles can be introduced into drilling fluid 140 that is injected into the wellbore 110. Regardless of the lithology of the surrounding formation 170, the properties of the nanoparticles make it so that they exhibit no tendency to interact with particles in crude oil or to be absorbed into the formation 170. As the drilling fluid 140 is pumped into the wellbore 110, it is propelled into the fractures 150. The nanoparticles can have low interfacial tension properties so as to avoid coagulation. The nanoparticles can have properties that cause them to emit a signal at a certain wavelength (or within a certain range of wavelengths) when excited by an external source.

The nanoparticles can become excited by exciting the surrounding drilling fluid. The drilling fluid can be excited using any appropriate technique, such as by introducing an electrical, magnetic, or electromagnetic field. The electromagnetic field can excite the drilling fluid, causing the nanoparticles to emit their own electromagnetic signal. The sensors 120 can detect and log these electromagnetic signals. In one example, the sensors 120 can take multiple readings over a period of time, which generates logs that track the nanoparticles.

Although references are made herein to injecting nanoparticles into drilling fluid, this is merely exemplary and not meant to be limiting in any way. For example, nanoparticles can be injected into any waterflooding scenario that occurs after a well is drilled. This can include open or closed-hole wells and a special injection using coil tubing.

The data recorded by the sensors 120 can be used to accurately identify locations of crude oil near the wellbore 110. For example, the data from each sensor 120 can indicate a range of possible locations for the source of the seismic activity. The source location of the seismic activity can be determined by superimposing the possible locations of each of the sensors 120 and identifying where they overlap. Using this technique, hydrocarbons proximally located to any portion of a wellbore can be accurately located.

Figure 2:
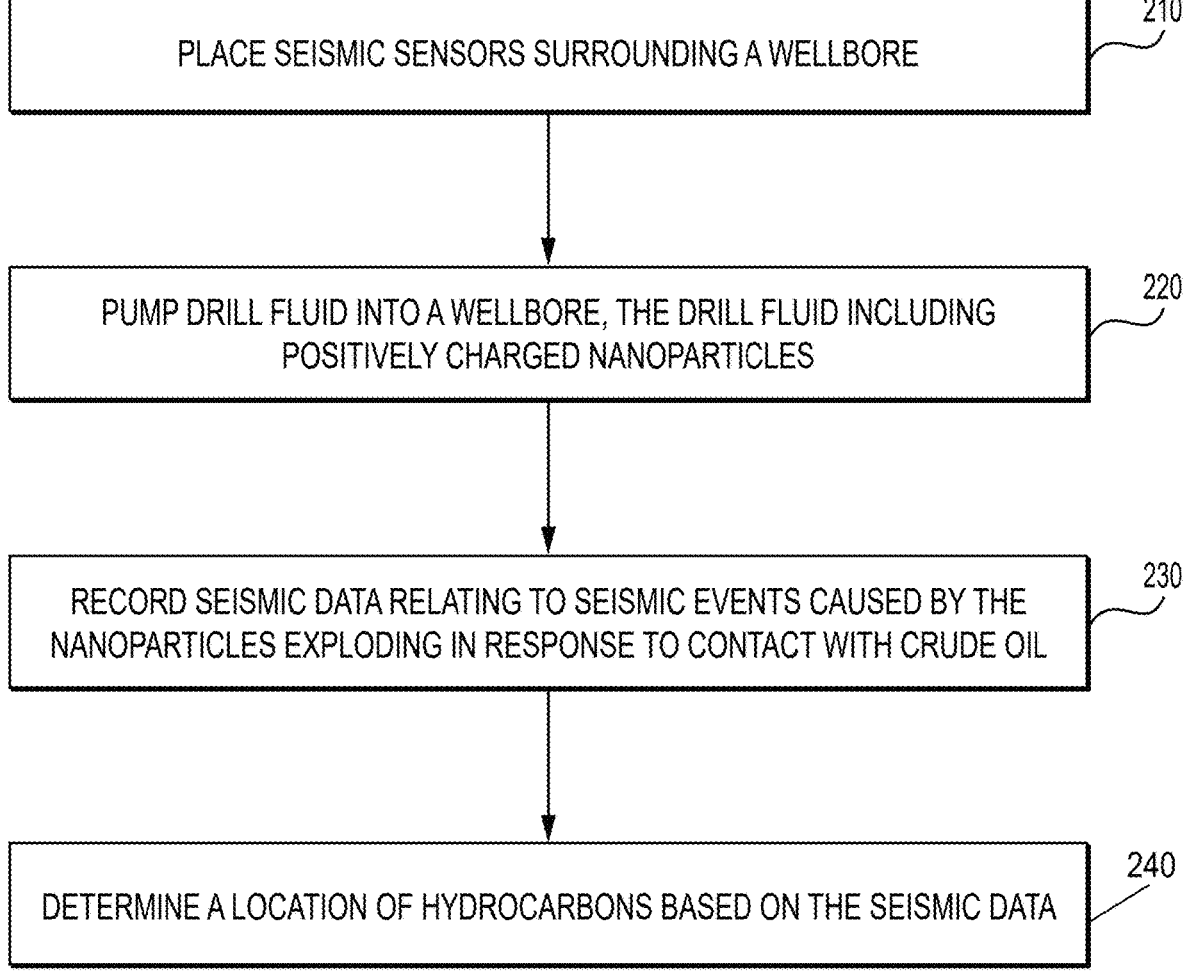
FIG. 2 is an example flow chart of a method for mapping hydrocarbon locations using nanoparticles.

FIG. 2 is an example flow chart of a method for mapping hydrocarbon locations using nanoparticles. At stage 210, seismic sensors are strategically positioned in and around a wellbore to measure ground motion when perturbations occur. For example, seismic sensors can be placed inside the wellbore, inside a neighboring wellbore, on the surface, and so on. The seismic sensors, or groups of the seismic sensors, can be strategically positioned so that their seismic readings can be combined to accurately determine the source location of a perturbation.

At stage 220, drilling fluid is pumped into the wellbore. The drilling fluid can be any fluid that can be pumped into a wellbore and contain nanoparticles, such as water or a mixture of water and other material commonly used in well drilling. Positively charged nanoparticles can be inserted into the drilling fluid before the drilling fluid is pumped into the wellbore. The nanoparticles can be reactive to certain particles found in crude oil such that contact with crude oil causes the nanoparticles to explode. In one embodiment, the drilling fluid can be pumped into the wellbore after a perforating gun has been lowered into the well and ignited charges, thereby fracturing the surrounding formations.

Pumping the drilling fluid into the wellbore forces the drilling fluid, and consequently the nanoparticles, into the surrounding formations. The drilling fluid penetrates the rock formations through any cracks or fractures. When the drilling fluid contacts any crude oil, the positively charged nanoparticles attract to negatively charged particles found in crude oil. Nearby nanoparticles travel to the fluid/oil interface where they explode after contacting the crude oil.

At stage 230, the seismic sensors record micro tremors caused by the exploding nanoparticles. The seismic sensors can send the recorded seismic data to a computing device that collects readings from the seismic sensors. In one embodiment, the computing device can include an application that processes the seismic data and presents the results in a meaningful way. For example, the computing device can display a depiction of the wellbore area, including the locations of each seismic sensor. The depiction can include data reported by the seismic sensors.

At stage 240, the location of hydrocarbons near the wellbore is determined based on the seismic data. For example, the application can display the estimated source location of the micro tremors according to each of the seismic sensors. The estimated source locations can be superimposed on each other so that a user can view overlaps. Alternatively, the application can identify overlapping locations and display those locations in the depiction of the wellbore area. The overlapping locations indicate tremor source location, which in turn indicate locations of crude oil in the proximity of the wellbore.

In one embodiment, the application can generate a three-dimensional rendering of the area surrounding the well bore. The three-dimensional rendering can include the locations of each of the seismic sensors. The application can insert the measured micro-tremor sources into the rendering and highlight where the measured sources overlap. The application can display the rendering on a display with the highlighted areas illustrating locations of crude oil and hydrocarbons.

Figure 3:
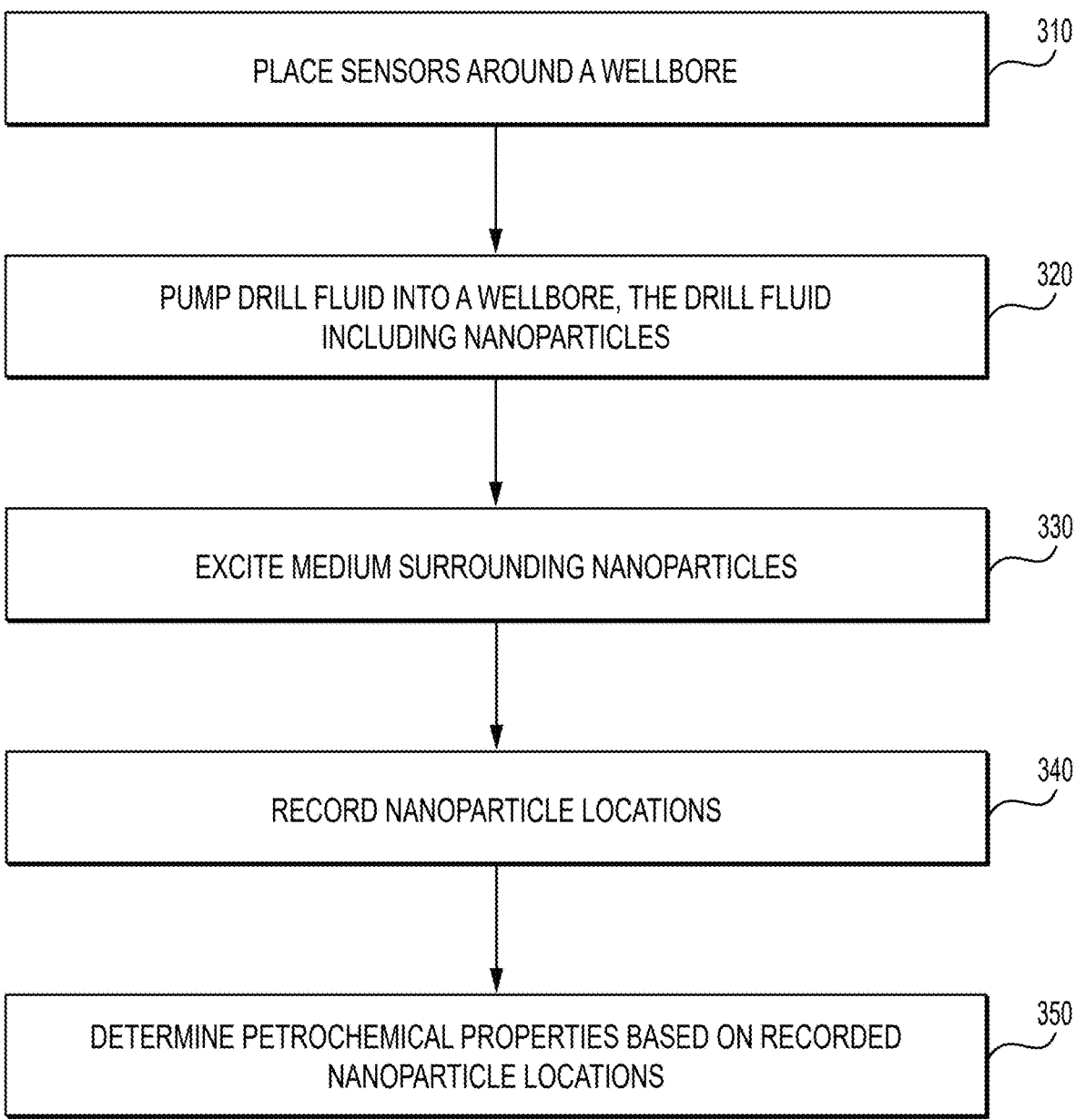
FIG. 3 is an example flow chart of a method for determining reservoir petrochemical properties.

FIG. 3 is an example flow chart of a method for determining reservoir petrochemical properties. At stage 310, sensors are strategically positioned in and around a wellbore. For example, sensors can be placed inside the wellbore, inside a neighboring wellbore, on the surface, and so on. The sensors, or groups of the sensors, can be strategically positioned so that their seismic readings can be combined to measure certain events or conditions near the wellbore, such as measuring the locations of nanoparticles in drilling fluid.

At stage 320, drilling fluid is pumped into the wellbore. The drilling fluid can be any fluid that can be pumped into a wellbore and contain nanoparticles, such as water or a mixture of water and other materials commonly used in well drilling. Regardless of the lithology of the surrounding rock formation, the properties of the nanoparticles make it so that they exhibit no tendency to interact with particles in crude oil or to be absorbed into the formations. As the drilling fluid is pumped into the wellbore, it is propelled into the fractures and penetrates any gaps, holes, crevices, and porous material. The nanoparticles can have low interfacial tension properties so as to avoid coagulation. The nanoparticles can have properties that cause them to emit a signal at a certain wavelength (or within a certain range of wavelengths) when excited by an external source.

In one example, a vector field can be applied to the surrounding wellbore area. A vector field can cause improved and quicker dispersing of the nanoparticles in the fluid. Various types of vector fields can be used to create this effect, such as generating an electromagnetic field, creating a temperature gradient between wells, creating a pressure gradient between wells, and so on.

At stage 330, the drilling fluid surrounding the nanoparticles can be excited. The drilling fluid can be excited using any appropriate technique, such as by introducing an electrical, magnetic, or electromagnetic field. As an example, an electromagnetic field can be created in or near the wellbore. The electromagnetic field can have enough strength to reach a desired distance from the wellbore. The electromagnetic field can excite the drilling fluid, causing the nanoparticles to emit their own electromagnetic signal. Alternatively, the excited nanoparticles can cause measurable changes in the surrounding electromagnetic field.

At stage 340, the sensors record the electromagnetic signals/changes caused by the nanoparticles. In one example, the sensors can take multiple measurements over a period of time, which generates logs that track the electromagnetic changes that indicate locations of nanoparticles.

In an example, the sensors can send the measurements to a computing device. The computing device can include an application that processes the data from the sensors and presents the results in a meaningful way. For example, the application can display a depiction of the wellbore area, including the location of each sensor. The application can interpret the data to identify nanoparticle locations. For example, the nanoparticles can cause electromagnetic changes or signals at a certain wavelength or range of wavelengths. The application can identify all measured changes or signals within a predetermined range of wavelengths and determine the locations of those changes to be locations of nanoparticles. The application can aggregate all the identified nanoparticle locations and generate a three-dimensional rendering of the wellbore area that includes all locations that the nanoparticles could reach, includes cracks, crevices, and porous openings in rock.

At stage 350, petrochemical properties of the wellbore area can be determined. For example, the data can be used to determine the permeability, heterogeneity, and channel tortuosity of the reservoir. The data can also be used to identify connectivity inter-wells zonation. In one example, the application can analyze the data and calculate these properties. The application can display the properties in a graphical user interface ("GUI") that a user can observe. The GUI can allow a user to select a location or area in the measured regions, and, in response, the GUI can display measured properties associated with the selected area.

The nanoparticle-containing fluid can be reinjected into the well at any point after the well is drilled. This can allow for reassessment of the reservoir's petrophysical properties at different stages of production and evaluating reservoir behavior during a carbon capture, utilization, and storage ("CCAS") life cycle.

Figure 4:
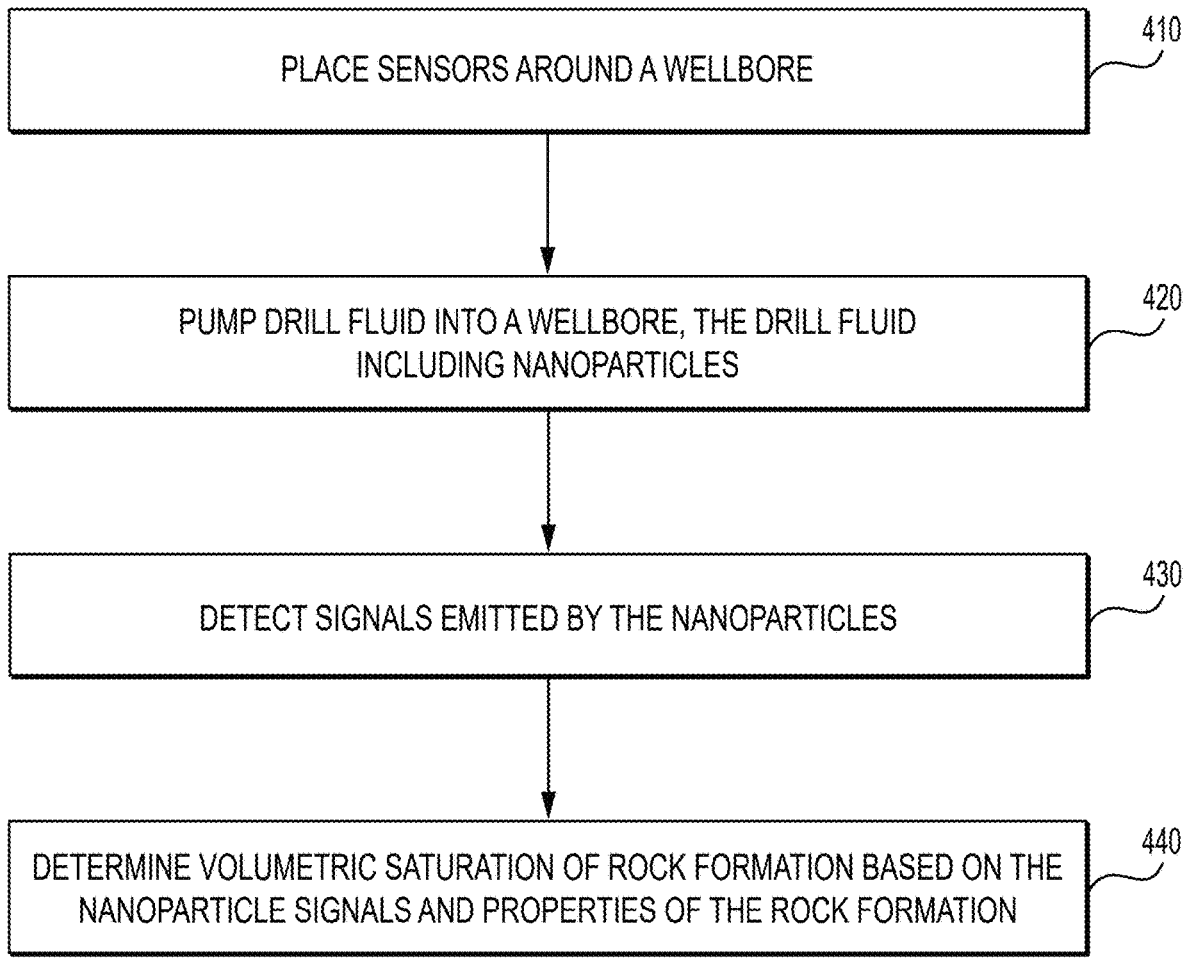
FIG. 4 is an example flow chart of a method for assessing hydrocarbon saturation between wells.

FIG. 4 is an example flow chart of a method for assessing hydrocarbon saturation between wells. At stage 410, sensors are strategically positioned in and around a wellbore. For example, sensors can be placed inside the wellbore, inside a neighboring wellbore (such as an injection well or an observation well), on the surface, and so on. The sensors, or groups of the sensors, can be strategically positioned so that their measurements of nanoparticle electromagnetic responses can be superimposed to determine the source location of the response, thereby indicating the presence of hydrocarbons.

At stage 420, drilling fluid is pumped into the wellbore. The drilling fluid can be any fluid that can be pumped into a wellbore and contain nanoparticles, such as water or a mixture of water and other materials commonly used in well drilling. The drilling fluid can be pumped into the wellbore during the production/injection phase of the drilling process. The injected nanoparticles can be attracted to the oil/water interface. For example, the nanoparticles can be positively charged, so that they are attracted to negatively charged particles present in crude oil.

As the water is pumped into the wellbore, it is propelled into the fractures and surrounding rock formations, penetrating any gaps, holes, crevices, and porous material. Whenever the drilling fluid contacts crude oil, the nanoparticles in the drilling fluid become attracted to the negatively charged particles in the crude oil, which draws the nanoparticles to the water/oil interface. Upon reaching the water/oil interface, the nanoparticles are absorbed into the crude oil. Properties of the nanoparticles can cause them to release a secondary component after absorption. In one example, the secondary component can be another type of nanoparticle. Properties of the secondary components can cause them to diffuse into the hydrocarbon phase of the crude oil and emit an electromagnetic signal/response.

For optimal results, the secondary components can have a high diffusivity coefficient for creating an elevated contrast of electric, magnetic, or dielectric properties in the host medium. This improves the electromagnetic signal/response, thereby increasing the likelihood of being detected at sensors in the injector, observation, and production wells.

Additional mechanisms can be used to further enhance the contrast and enhance the signal/response detectability. For example, the secondary components can have surface coatings that cause the secondary components to prefer to agglomerate, which produces a more concentrated electromagnetic response. Additionally, the secondary components can be made to form a periodic array, which can enhance scattering at a specific wavelength, such as through formation of a Bragg grating.

At stage 430, the sensors record the electromagnetic signals/responses emitted by the secondary nanoparticles. For example, the sensors can be configured to detect electromagnetic signals within the wavelength and frequency ranges known to be emitted by the secondary nanoparticles when diffused in hydrocarbons. Whenever such a signal is detected, a sensor can measure and record the properties (e.g., wavelength, frequency, amplitude, etc.).

At stage 440, volumetric saturation of hydrocarbons in the rock formations can be determined based on the nanoparticle signals and properties of the rock formation. For example, the sensors can send the measurements to a computing device. The computing device can include an application that processes the data from the sensors and presents the results in a meaningful way. For example, the application can display a depiction of the wellbore area, including the location of each sensor. The application can interpret the data to identify nanoparticle locations. For example, corresponding data from multiple sensors can be superimposed to identify the source of an electromagnetic response from a nanoparticle (or group of nanoparticles). Because the secondary nanoparticles emit an electromagnetic signal in response to diffusion in hydrocarbons, the signal source locations indicate the presence of hydrocarbons. The application can aggregate all the identified nanoparticle locations and generate a three-dimensional rendering of the wellbore area that includes all locations where nanoparticle electromagnetic responses were detected (i.e., the volumetric saturation of hydrocarbons in the of rock formations).

In one example, the application can analyze the data and calculate these properties. The application can display the properties in a GUI that a user can observe. The GUI can allow a user to select a location or area in the measured regions, and, in response, the GUI can display measured properties associated with the selected area.

The nanoparticle-containing fluid can be reinjected into the well at any point after the well is drilled. This can allow for reassessment of the reservoir's petrophysical properties at different stages of production.

Other embodiments of the invention will be apparent to those skilled in the art from consideration of the specification and practice of the invention disclosed herein. It is understood that the control functionality can be carried out by a processor-enabled device, which can be separate from or part of the slot cutter, depending on the example. Also, the terms slot cutter and cutting device are used interchangeably. It is intended that the specification and examples be considered as exemplary only, with a true scope and spirit of the invention being indicated by the following claims.

What is claimed is:

1. A method for assessing hydrocarbon saturation between a first well and a second well, comprising:

placing a first sensor in a first well and a second sensor in a second well;

pumping fluid into the first well, thereby causing the fluid to pass into surrounding rock formations, wherein the fluid includes a plurality of nanoparticles that are attracted to fluid/oil interfaces, absorb into oil at fluid/oil interfaces, and release secondary components upon absorbing into oil;

measuring, at the first sensor and the second sensor, electromagnetic signals emitted by the secondary components, the secondary components having emitted the electromagnetic signals in response to being released into oil by the nanoparticles and diffusing into hydrocarbons in the oil; and determining a location of the hydrocarbons based on the measuring of the electromagnetic signals emitted by the secondary components.

2. The method of claim 1, wherein the fluid is pumped into the first well during a production phase of a drilling operation.

3. The method of claim 1, wherein the fluid is pumped into the first well after a production phase of a drilling operation is complete.

4. The method of claim 1, wherein determining the location of the hydrocarbons comprises:

superimposing first measurements of the electromagnetic signals by the first sensor with second measurements of the electromagnetic signals by the second sensor;

identifying where the first measurements and the second measurements indicate a same source location of the electromagnetic signals; and identifying the same source location as the location of the hydrocarbons.

5. The method of claim 1, wherein the secondary components are secondary nanoparticles.

6. The method of claim 1, wherein the nanoparticles are positively charged, and the positive charge of the nanoparticles causes the nanoparticles to be attracted to negatively charged particles in the oil.

7. The method of claim 1, wherein the first well is a production well and the second well is at least one of an observation well and an injection well.

8. The method of claim 1, wherein the secondary components include a surface coating that causes the secondary components to be attracted to each other, thereby increasing the amplitude of the electromagnetic signals emitted.

9. The method of claim 1, wherein the secondary components include properties that cause the secondary components to align in a periodic structure that enhances scattering of incoming waves.

10. The method of claim 1, further comprising injecting the nanoparticles into the fluid.

11. The method of claim 1, wherein the sensors are strategically placed to maximize accuracy of the measured electromagnetic signals.

12. The method of claim 1, further comprising:

receiving, at a computing device, measurements of the electromagnetic signals;

identifying, at the computing device, locations of the secondary components based on the measurements;

aggregating, at the computing device, the identified locations of the secondary components;

generating, at the computing device, a three-dimensional rendering of an area surrounding the first well;

inserting, at the computing device, the aggregated locations of the secondary components into the three-dimensional rendering; and displaying, at the computing device, the rendering on a display.

13. The method of claim 10, wherein properties of the surrounding rock formations are used in combination with measured electromagnetic signals in determining the location of the hydrocarbons.

14. The method of claim 1, wherein the first well is one of an open hole well or a closed hole well.

15. The method of claim 1, wherein the nanoparticles are injected into the fluid through a coiled tubing.

16. The method of claim 1, wherein the measured electromagnetic signals include at least one of an electric contrast, a magnetic contrast, and a dielectric contrast.

17. A system for assessing hydrocarbon saturation, comprising:

a first sensor positioned within a first well;

a second sensor positioned within a second well;

fluid having nanoparticles that are attracted to fluid/oil interfaces, absorb into oil at fluid/oil interfaces, and release secondary components upon absorbing into oil; and a computing device, wherein a location of hydrocarbons between the first well and the second well is determined by performing stages comprising:

pumping the fluid into the first well, thereby causing the fluid to enter surrounding rock formations;

receiving first measurements from the first sensor and second measurements from the second sensor, wherein the first measurements and second measurements include measurements of electromagnetic signals emitted by the secondary components, the secondary components having emitted the electromagnetic signals in response to being released into oil by the nanoparticles and diffusing into hydrocarbons in oil; and determining the location of the hydrocarbons based on the measurements.

18. The system of claim 17, wherein determining the location of the hydrocarbons comprises:

superimposing the first measurements with the second measurements;

identifying where the first measurements and the second measurements indicate a same source location of the electromagnetic signals; and identifying the same source location as the location of the hydrocarbons.

19. The system of claim 18, wherein the electromagnetic signals are measured over a period of time, and petrochemical properties of a reservoir are determined at least in part by aggregating the identified same source locations over the period of time.

20. The system of claim 18, wherein the secondary components are secondary nanoparticles.

* * * * *